(12) United States Patent
Sant et al.

(10) Patent No.: US 10,970,773 B2
(45) Date of Patent: Apr. 6, 2021

(54) SMART CAP AND/OR HANDLE

(71) Applicant: Dollar Shave Club, Inc., Marina del Rey, CA (US)

(72) Inventors: Adam Sant, Los Angeles, CA (US); Matt Reamer, Moseley, VA (US); Alan Wizemann, Redondo Beach, CA (US)

(73) Assignee: Dollar Shave Club, Inc., Marina del Rey, CA (US)

( * ) Notice: Subject to any disclaimer, the term of this patent is extended or adjusted under 35 U.S.C. 154(b) by 0 days.

(21) Appl. No.: 16/254,371

(22) Filed: Jan. 22, 2019

(65) Prior Publication Data

US 2019/0156398 A1    May 23, 2019

Related U.S. Application Data

(63) Continuation-in-part of application No. 16/045,512, filed on Jul. 25, 2018.

(60) Provisional application No. 62/536,756, filed on Jul. 25, 2017.

(51) Int. Cl.
| | |
|---|---|
| *G06Q 30/00* | (2012.01) |
| *G06Q 30/06* | (2012.01) |
| *G01G 15/00* | (2006.01) |
| *G06Q 10/08* | (2012.01) |
| *B65D 79/00* | (2006.01) |
| *B65D 51/24* | (2006.01) |

(52) U.S. Cl.
CPC ....... *G06Q 30/0633* (2013.01); *G01G 15/006* (2013.01); *G06Q 10/087* (2013.01); *B65D 51/245* (2013.01); *B65D 79/00* (2013.01); *B65D 2203/10* (2013.01)

(58) Field of Classification Search
CPC .................................................... G06Q 30/00
See application file for complete search history.

(56) References Cited

U.S. PATENT DOCUMENTS

| | | | |
|---|---|---|---|
| 7,801,745 | B2 | 9/2010 | Walker et al. |
| 7,933,733 | B2 | 4/2011 | Ashrafzadeh |
| 8,269,613 | B2 | 9/2012 | Lazar |
| 8,319,613 | B2 | 11/2012 | Lazar |
| 8,477,029 | B2 | 7/2013 | Ashrafzadeh |

(Continued)

FOREIGN PATENT DOCUMENTS

| | | |
|---|---|---|
| CN | 202075006 | 12/2011 |
| WO | WO 2016/155970 | 10/1916 |

(Continued)

OTHER PUBLICATIONS

Lee, Kate, "How the Internet of Things will change your world", Supply Chain Quarterly, dated Mar. 6, 2015. (Year: 2015).*

(Continued)

*Primary Examiner* — Mark A Fadok
(74) *Attorney, Agent, or Firm* — DLA Piper LLP (US)

(57) ABSTRACT

Systems and methods here may be used to sense razor handle usage, and/or product content in a container, send information to a local wireless device which may in turn, inform a back end system. In some embodiments, the systems and methods may then utilize the information about the container and send a message regarding inventory status, place an order for a re-fill, and/or aggregate usage data of the container or handle.

20 Claims, 8 Drawing Sheets

(56) References Cited

U.S. PATENT DOCUMENTS

| | | |
|---|---|---|
| 8,924,262 B2 | 12/2014 | Shuster |
| 9,129,249 B2 | 9/2015 | Hu et al. |
| 2002/0161652 A1 | 10/2002 | Paullin |
| 2003/0095157 A1 | 5/2003 | Comer et al. |
| 2009/0056141 A1* | 3/2009 | Barry .................. B26B 21/40 30/41.7 |
| 2010/0101317 A1 | 4/2010 | Ashrafzadeh |
| 2010/0102930 A1 | 4/2010 | McCoy |
| 2010/0106515 A1 | 4/2010 | McCoy |
| 2010/0106521 A1 | 4/2010 | Ashrafzadeh |
| 2010/0106624 A1 | 4/2010 | Ashrafzadeh |
| 2010/0106625 A1 | 4/2010 | McCoy |
| 2010/0106626 A1 | 4/2010 | Ashrafzadeh |
| 2013/0145623 A1* | 6/2013 | Wain .................. B26B 21/521 30/41 |
| 2014/0263430 A1 | 9/2014 | Keating et al. |
| 2015/0182797 A1 | 7/2015 | Wernow et al. |
| 2015/0185778 A1* | 7/2015 | Nielsen ............... G06F 1/1635 361/679.3 |
| 2015/0329260 A1 | 11/2015 | Singh |
| 2015/0355012 A1 | 12/2015 | Gurumohan et al. |
| 2015/0375410 A1* | 12/2015 | Wain .................. B26B 21/521 30/41 |
| 2016/0143583 A1 | 5/2016 | Jeukendrup et al. |
| 2016/0167241 A1* | 6/2016 | Goldfarb .............. B26B 21/28 382/108 |
| 2016/0198246 A1 | 7/2016 | Gurumohan et al. |
| 2016/0220184 A1 | 8/2016 | Manion |
| 2016/0247118 A1 | 8/2016 | Singh |
| 2016/0256357 A1 | 9/2016 | Stein et al. |
| 2016/0324726 A1 | 11/2016 | Roberts et al. |
| 2016/0327427 A1 | 11/2016 | Briones et al. |
| 2017/0050327 A1* | 2/2017 | Alam .................. B26B 21/446 |
| 2017/0097758 A1* | 4/2017 | Bauer ............... A46B 15/0004 |
| 2017/0099199 A1* | 4/2017 | Bauer .............. B26B 21/4056 |
| 2017/0232624 A1* | 8/2017 | King .................... G01K 1/14 30/34.05 |
| 2018/0028410 A1 | 2/2018 | Yun et al. |
| 2018/0184971 A1 | 7/2018 | Hong |
| 2018/0207362 A1 | 7/2018 | Wei |
| 2019/0224870 A1* | 7/2019 | Robinson .............. B26B 21/227 |

FOREIGN PATENT DOCUMENTS

| | | |
|---|---|---|
| WO | WO 2016/197415 | 12/1916 |
| WO | WO 2004/049237 | 6/2004 |
| WO | WO 2005/002283 | 1/2005 |
| WO | WO 2015/031472 | 3/2015 |

OTHER PUBLICATIONS

Raab, Lauren, "Amazon's dash button for quick reordering, is not and April fools' joke", Los Angeles Times, dated Mar. 31, 2015, 9 pages.

* cited by examiner

SMART CAP AND/OR HANDLE

RELATED CASES

This application is a Continuation-In-Part of U.S. Ser. No. 16/045,512 filed Jul. 25, 2018 which in turn relates to and claims priority from U.S. Provisional 62/536,756 filed Jul. 25, 2017 which are both incorporated herein by reference in their entireties.

TECHNICAL FIELD

This application relates to the field of electronic sensors, wireless communications, and analysis of data derived from such sensors.

BACKGROUND

Consumer products are used daily all over the world. The containers used to store these consumer products often include a container body to hold the product and some kind of removable or openable orifice to allow the product to be extracted from the container body. But consumers use these products without the ability to know how much is left, to inventory their use or analyze the amount left in the containers. Therefore, people have trouble keeping the right products stocked and purchasing the right products when the products need replenishment.

Likewise, manufacturers of products do not know which consumers utilize products, when they utilize products, and inventory levels in individual homes or workplaces. Therefore, manufacturers, who may know point of sale data, are unaware of more granular use data of any given product. Not only could manufacturers benefit from better understanding use habits of consumers and inventory levels, subscription services could benefit from knowing inventory in order to automate ordering and shipping of replacements, to minimize or eliminate a situation where a product has run out and no replacement is on hand.

The systems and methods here may be used to solve these technical problems with technical solutions that utilize sensors, wireless communications, and data analytics.

SUMMARY

Systems and methods here may be used to sense product content in a container, send information to a local wireless device which may in turn, inform a back end system. In some embodiments, the systems and methods may then utilize the information about the container and send a message regarding inventory status, place an order for a re-fill, and/or aggregate usage data of the container.

Systems and methods here include, sensing a weight of a container and contents in a hollow body of the container by a piezoelectric sensor positioned inside a removable cap, the removable cap configured to fit over an opening in the container, receiving weight data from the piezoelectric sensor by a computing device positioned inside the removable cap, sending weight data from the computing device to a mobile device by a wireless communication system positioned inside the cap. In some examples, further comprising, determining, by the computing device, time and wherein the data sent via the wireless communication system includes time data. In some examples, further comprising, sensing, by a flowmeter positioned inside the container, flow of material from the hollow body of the container through the opening. In some examples, further comprising, communicating, by the flowmeter to the computing system, regarding any sensed flow rates of material from the hollow body of the container through the opening. In some examples, the wireless communication system is a Bluetooth Low Energy (BLE) system or a WiFi system. Some examples, further including sensing vibration by a vibration sensor and sensing bottle orientation by a tilt-ball sensor. In some examples, the removable fit of the cap over the opening in the container includes a gasket to keep moisture out.

Some examples, further comprising, receiving the weight data at a back end computer from the piezoelectric sensor by the wireless communication system positioned inside the cap and by a mobile computing device, determining whether the received weight data indicates a new product needs to be ordered, correlating the received weight data and a customer account, ordering a replacement product to the customer account, if the determining indicates that a new product needs to be ordered.

Some examples include system with a razor handle, a piezoelectric sensor positioned inside the handle, configured to sense movement of the handle; a contact sensor positioned on a docking end of the handle, a wireless communication system positioned in the handle, a computing device in communication with the sensor and the wireless communication system, the computing device configured to receive a signal from the sensor regarding the movement of the handle, and contact information from the contact sensor, and send data via the wireless communication system to a mobile device regarding the movement and contact.

DETAILED DESCRIPTION

Figure 1:
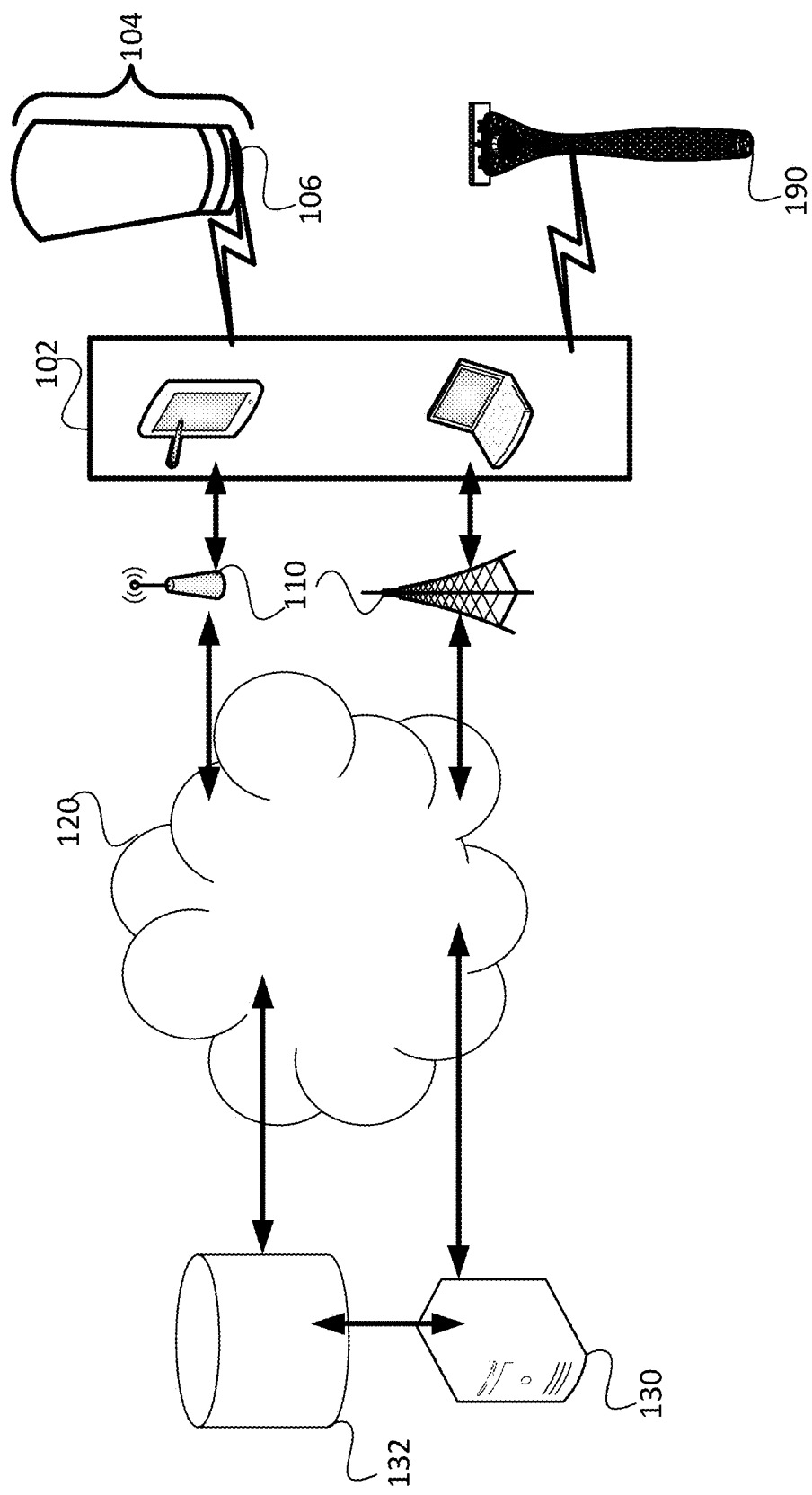
FIG. 1 is a network diagram used to practice the methods according to certain embodiments disclosed here.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known data structures, timing protocols, software operations, procedures, and components have not been described in detail so as not to unnecessarily obscure aspects of the embodiments of the invention.

Overview

Systems and methods here provide embedding technology into product containers to sense how much product is used and/or left inside the product containers or bottles. The systems may then communicate the sensor information and/or analyzed sensor information to a nearby smart enabled client wireless device which in turn may communicate with back end systems. At the back end, the systems may utilize the sensor information to automatically renew a product for a consumer by previously arranged subscription and analyze the information for future usage estimation, or other purposes.

Such an arrangement may enable the overall systems described here the ability to know when a customer user product is running low and act on that information by reordering, given the owner's previous consent. In some example embodiments, these electronic systems may be embedded into the cap of a product itself and thus augment the subscription experience hidden from the sight of a user. Having sensors and communication systems embedded into the actual product as opposed to requiring the owner of the product to pro-actively order a refill, or order before the product is empty and store extra product, are advantageous and efficient.

Other advantages include the ability to capture usage data of the product(s) by way of the smart systems. By harnessing consumption data, it could be observed, analyzed, and used to understand how products are being used, how much of that product is being used at a time. In some examples, such information may be coupled with customer user data to tie usage data to a user profile. This could help the systems recommend products for customer users through messaging and become more knowledgeable about product usage so that future products can be portioned appropriately.

Such systems and methods could be used with a products such as products retained in tubes that include a spout and a cap. Such product tracking features could be located in the product cap to track usage and report information. Another example is a razor handle. Such product tracking features could be located in the razor handle and track usage and report information.

Smart Cap System Example Overview

FIG. 1 is a network diagram which shows an example high level overview of the product sensing and wireless communication. In example FIG. 1, a smart device 102 such as a smartphone, laptop, tablet, watch, glasses, or other computing device capable of wireless communications is placed in proximity of a product 104 described here, and include software such as an application capable of coordinating communication, data collection, causing data storage, and/or otherwise operating on the computing device. The product bottle 104 in these examples is arranged in an upright position, thereby placing a cap portion 106 under the product which is inside the bottle 104. Thus, the cap 106 on the bottle 104 may include sensors to sense the weight of the product on top of it in some examples. Additionally or alternatively, in some example embodiments, a flow meter or other sensor may also sense product usage and help determine what is left in the bottle 104. The example smart cap 106 may also include wireless communication modules as described herein which enable it to communicate with the nearby smart device 102 which may be running an application or other software to facilitate such communication. Such communication between the product bottle 104 and the smart device 102 may be through wireless communications such as Bluetooth low energy, WiFi, cellular, pico cell, Near Field Communications, or any other ways. Wireless communications by the smart device 102 and the back end servers 130 may be through cellular, or WiFi 110 or other example wireless communications through a network 120 such as the internet. Such communications may be to any arrangement of back end systems 130 such as a one or multiple server(s) with one or multiple processors and memory, other computer including data storage 132. Such data storage 132 may be in direct communication with the back end systems 130 or through distributed arrangement via the network 120. As described herein, through this or similar arrangement, information of product 104 usage may be communicated to the back end servers 130 for analysis, and for product reordering.

In such example embodiments, the product 104 cap 106 may house electronics including a battery, communications module such as but not limited to a Particle P1 WiFi module with an antenna and a small computer (SoC) on a single integrated circuit containing a processor core, memory, and programmable input/output peripherals. In some example embodiments, the printed circuit board (PCB) may feature surface mount components locked in by a rubber gasket to keep the electronics dry from any water or steam in the bathroom during the use of the product.

In some example embodiments, communication modules such as a WiFi module may be powered by a WiFi chip and microcontroller such as for example but not limited to a reprogrammable STM32 32-bit ARM Cortex-M3 microcontroller. In such examples, the P1 may be loaded with Particle firmware and includes proprietary basic cloud service.

In such examples, the P1 may include a built-in antenna and a uFL connector for wireless communications. Such examples may have additional external flash memory to accommodate different projects.

WiFi example specifics include but are not limited to: Single band 2.4 GHz IEEE 802.11b/g/n; Supports wireless data rates of up to 65 Mbit/s; Ultra low power sleep, stand-by and stop modes; Supports Open, WEP, WAPI, WPA and WPA2-PSK WiFi security modes.

Similarly, the technology features described herein could be embedded or housed in a razor handle 190 as described below and in FIG. 8.

Sensor Examples: Piezo Electric Example

Systems and methods here may include may various sensors in order to help determine product usage. Examples of sensors include, additionally or alternatively, weight and vibration sensors such as piezo electric sensors. Other sensors such as force sensors, tilt balls, and flow meters may be used in certain examples as well. Additionally or alternatively to determine orientation of products, sensors such as a tilt ball or gyro including a ring laser gyro may be used. In some example embodiments, other kinds of liquid measurement sensors may be used.

In some examples, sensors may be in communication with microcontroller(s) such as but not limited to: STM32F205 120 Mhz ARM Cortex M3; 1 MB flash, 128 KB RAM; P1 module dimensions are: 0.787"(28 mm) (W)×1.102"(20 mm) (L)×0.0787"(2.0 mm) (H)+/−0.0039"(0.1 mm) (includes metal shielding).

Sensor Examples: Flow Meter Example

Alternatively or additionally, in some examples, a flow meter may be used as a sensor in the cap or orifice of the product to track product usage. In such examples, an analog output flow meter may be installed between the cap and the bottle. Such an example sensor may be positioned in line with the flow of product and use a pinwheel sensor to measure how much product has moved through it. Such an example pinwheel may have a magnet attached, utilizing a hall effect magnetic sensor on the other side of the plastic tube that can measure how many spins the pinwheel has made through the plastic wall. Such an example method allows the sensor to stay safe and dry. The example liquid flow meter was sending analog values to a particle photon and waiting for the value to count up to a certain amount of ounces (6 our 7 full ounces in the bottle) then it would send a push notification through to the iOS & Android app Prowl with a direct link to reorder product from the application on the smart device. Such an example message like a push notification was being sent using a message service such as but not limited to Twillio SMS services.

Such an example flow meter solution may be an accurate method for detecting product usage but posed technical problem in that it is physically hard to fit this technology into such a small area without increasing cost.

eTape Liquid Sensor Example

Alternatively or additionally, an a eTape Liquid Level Sensor may be housed inside the bottled product and take the reading of that product based on the amount of liquid force is inside the product bottle. Such an eTape Liquid Level Sensor may measure the level of a liquid. It may utilize a resistive output that varies with the level of the fluid. Such a sensor's envelope is compressed by the hydrostatic pressure of the fluid in which it is immersed. This may result in a change in resistance that corresponds to the distance from the top of the sensor to the surface of the fluid.

Automatic Refill Examples

Figure 2:
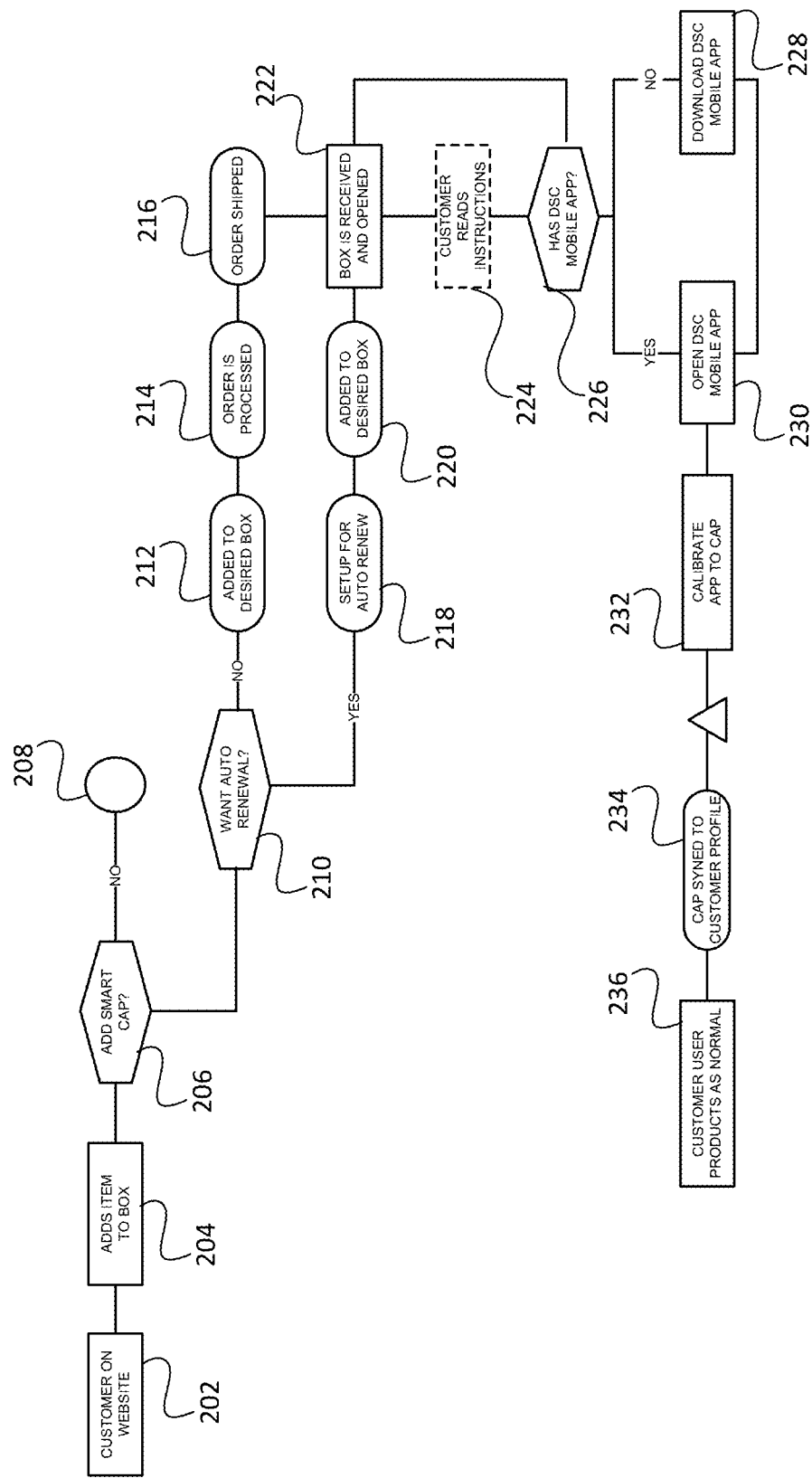
FIG. 2 is a strategy flow chart according to certain embodiments disclosed here.

The hardware and software may be embedded within the cap itself and would be reused time and time again as the member or cap itself orders re-fill. FIG. 2 shows an example flow of how such an example process may operate using the hardware described here.

First, a customer logs into a website 202 and adds an item to buy 204. The system determines whether the item that was added to buy includes the smart technology described here 206. If no, the flow chart ends 208. If yes, and the item includes a smart hardware, the system prompts the user to select whether they want this item to be signed up for automatic renewal 210. If no, the item is still added to the cart 212, processed 214 and shipped 216. But if the customer selects that he or she does want to set up for automatic renewal the system processes that order with an indication in the system servers that automatic renewal has been selected 218. Then the item is added to the desired box 220 and the order is processed 214 and shipped 216 as indicated.

Once the box is received at the user's receiving end and opened 222, the customer reads the instructions 224 which may be online or through a webpage and the system determines whether the user has the application 226. If the user does not have smart mobile device with the correct renewal application installed the user may be prompted to download and install such software 228. If the user has the appropriate application on a smart device it may be opened 230 and calibrated to add the new cap on the new product 232. As described, the communication between the hardware and software in the cap and the hardware and software in the mobile device may be through many different wireless communication arrangements including but not limited to WiFi, Bluetooth low energy, Near Field Communications, cellular transmissions, picocell, nanocell or any other kind of wireless communication. Such communication may flow to the smart device and the application on it, and may in some example embodiments include communication with a back end server as described herein. Such communication may include permissions for particular users to utilize their smart cap technologies, trend analysis for users, users in the same family or network, users of particular products or items. In any case, once the cap hardware and software is in communication with the smart device and application 234 the customer is free to use the product as desired 236.

In use, the cap may detect product usage through any of various sensors described herein. Some examples include flow meters or weight sensors. In any case, once a threshold is met or exceeded, indicating that use of the product has consumed most in the container, the smart cap may indicate that this threshold is met or exceeded to the application on the smart mobile device. This notification may include an identifying indicator such as a serial number, product number, identification number, encryption key, or other indicator so that the application and/or back end servers may determine which product owned by which user is to be refilled automatically.

Figure 3:
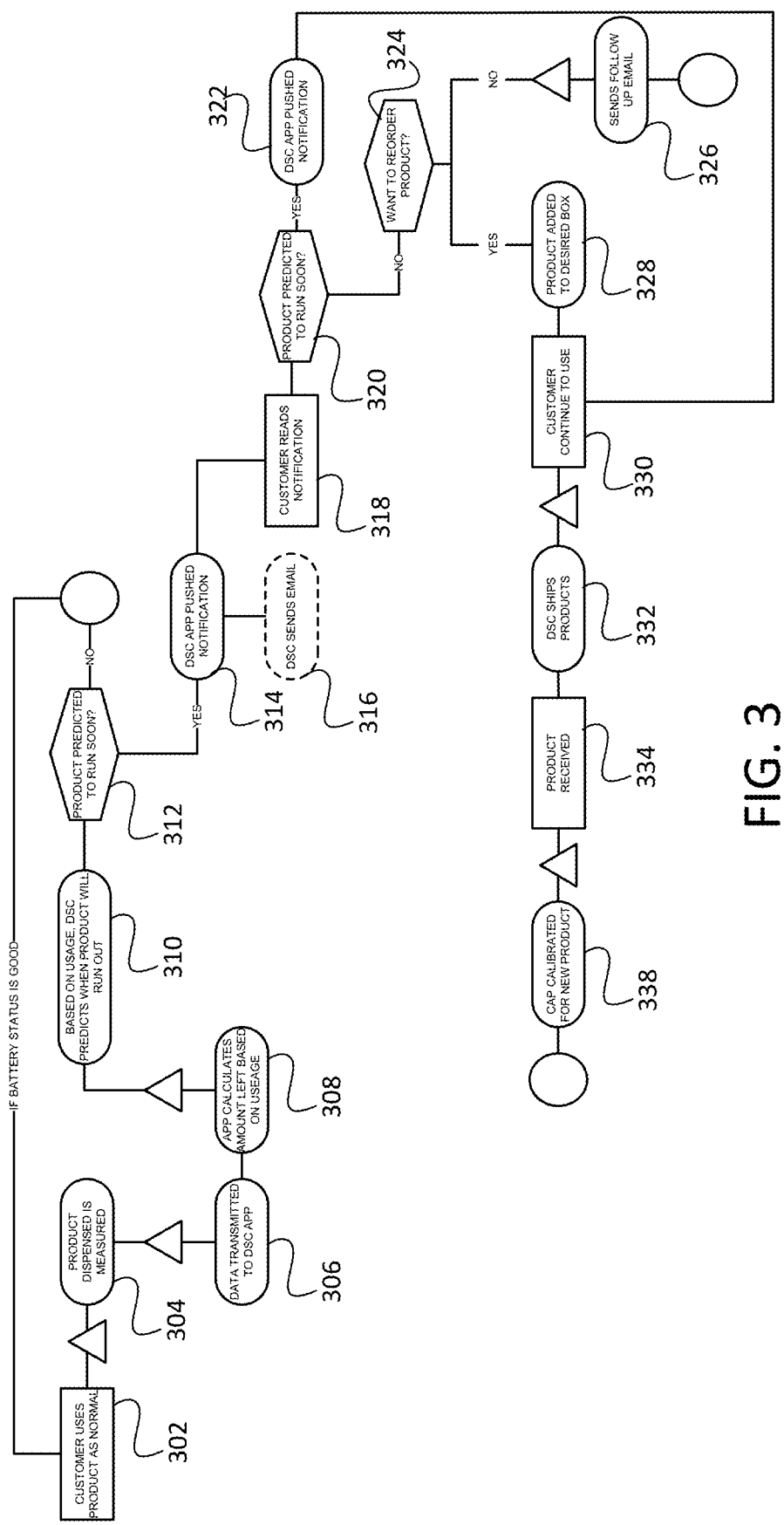
FIG. 3 is a strategy flow chart according to certain embodiments disclosed here.

FIG. 3 show a flow chart example of usage by a consumer and the interactions with the smart cap technology to automatically refill a product. To begin in the example, the customer utilizes the product normally 302. Next, during use, the smart cap hardware and software detects and/or measures consumption of the product 304. The measurement data is then transmitted, along with relevant identifying information, to the mobile device application and in some example embodiments, to the back end servers 306. The application and/or back end servers may calculate, based on the indication of the product and history of usage, the amount remaining in the container 308. In some examples, the hardware/software in the smart cap itself determines the remaining amount of material left in the container. In some examples, the application on the smart wireless device determines the remaining amount of material left in the container. In some examples, the software on the back end servers determine the remaining amount of material left in the container. In some examples, any combination of the above is used to determine the remaining amount of material left in the container. However it is determined, based on the usage, the application may generate a prediction of when the product will run out 310. In some example embodiments, a threshold is determined based on any combination of historical past usage by the individual user, usage trends of similar users, usage trends of users who are in close proximity to the individual user, or other example. Next, in some examples, once the predicted threshold is neared 312, the application on the smart mobile device receives a notification from the smart cap hardware/software 314. In some examples, the back end servers may then generate a message to send to the user that the product is nearly empty 316. In some examples, the user may read such a message 318 and if the automatic renewal 320 is selected, the back end servers send instructions to ship a replacement product 322. If the automatic renewal 320 is not selected, the user may be prompted by the system, through a message or website page, to request a reorder to replace the product 324. If the user selects that they do not, the system may send a follow up message to remind them of the empty product anyway 326. If the user selects to reorder the product, the product may be added to a cart/box for shipment 328. If the customer user continues to use the product 330 then the back end servers instruct shipment 332. Once the product is received by the customer user 334, the customer user may replace the cap of the new product with the cap of the old product in order for the system to then refresh, recalibrate for the new product 338. Additionally or alternatively, in some example embodiments, the new product has its own smart cap which has its own identifier and the process for new registration begins as described in FIG. 2.

Power Conservation Examples

In some example embodiments, power conservation may be taken into consideration in order to conserve power in the cap electronics. In such examples, a small vibration sensor may be included in a smart cap that may put the cap hardware/software to sleep or hibernation mode when it is not active and wake it up when it is active, thus conserving power. In such examples, the electronics may be awoken when the vibration sensor is activated, and put to sleep on standby after a certain time elapsed from the last vibration reading.

In some examples, before communications are made, such as before a push notification is sent, logic may be used to ensure the smart cap is sending message at the right time. Example sensors such as but not limited to a tilt-ball sensor may be included to indicate the device orientation which combined with the pressure and a time-out function may provide a greater certainty of when the product is running out.

To conserve power, which would ensure a long lasting battery so the user would rarely have to replace the cap itself, the system may only take readings directly after use. In some example embodiments, this may be triggered by variables in sensors such as but not limited to, a force sensor, tilt ball switch and a piezo vibration sensor. These example component readings may help pinpoint a time to take a weight reading, then send the cap electronics into stand-by or power conservation mode.

Thus, as a power saving measure, the electronics in the cap may be woken up using the sensors, for example, but not limited to if the vibration sensor reads high and the tilt-ball reads false. In some examples, then the system may determine if that if the force sensor reads greater than the weight of the bottle in addition to some threshold number, and the vibration sensor reads true and the tilt ball switch reads true, wait some amount of time, such as but not limited to 10,000 milliseconds, then go through these same validation steps, and if these are all still correct, send communication. If not, check again in some amount of time, such as but not limited to 10,000 milliseconds, and if it comes back false again go into stand-by mode.

In some examples, to ensure battery life being full until the cap's first use, a pull tab which may separate the positive side of the battery from the connector. In such examples, the battery would not begin discharge unless and until a user pulled the pull tab and thereby removed the obstacle from between the battery positive side and the electronics lead.

Figure 4:
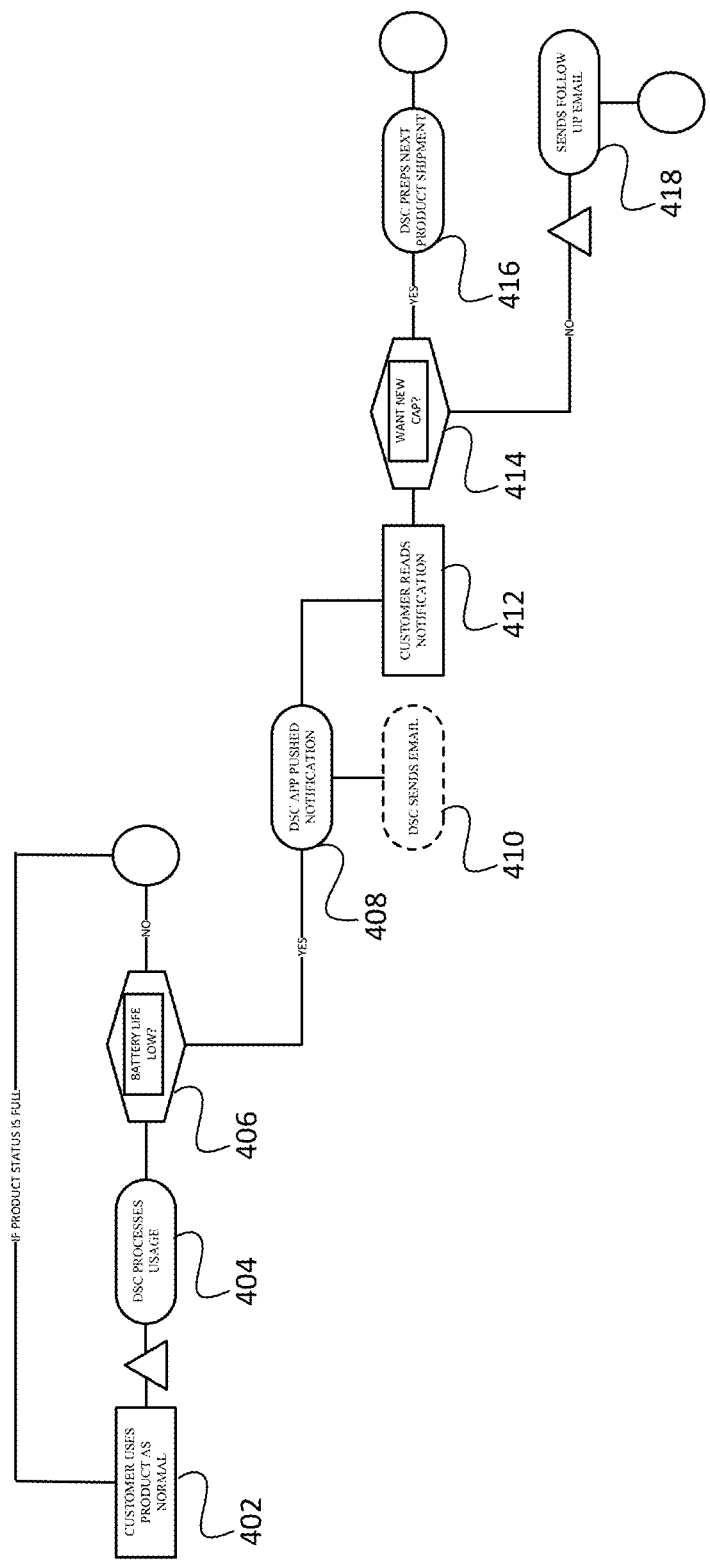
FIG. 4 is a strategy flow chart according to certain embodiments disclosed here.

FIG. 4 shows an example flow chart of the system checking its own battery power. In FIG. 4, if the product is still full, or not ready for a refill, the customer may use the product normally 402. Next, in use, the sensors may send data to the smart mobile device and in some examples, to the back end systems 404. If the battery life runs low 406, the application or back end system 408 may generate a push notification of any sort (i.e. email, text, message, etc.) for the customer user 410. If the product is still full, the flow returns to the beginning 402. Once the customer receives and/or reads the notification 412, the customer user may want a new smart cap with a new battery 414 and make that selection on the software. If so, the back end servers may instruct shipment of a new cap, a new battery, or a new product with a new cap 416. If the customer does not indicate that she wants a new cap, the system may send a follow up email to the user for notification 418.

Pressure Mat Examples

Figure 5:
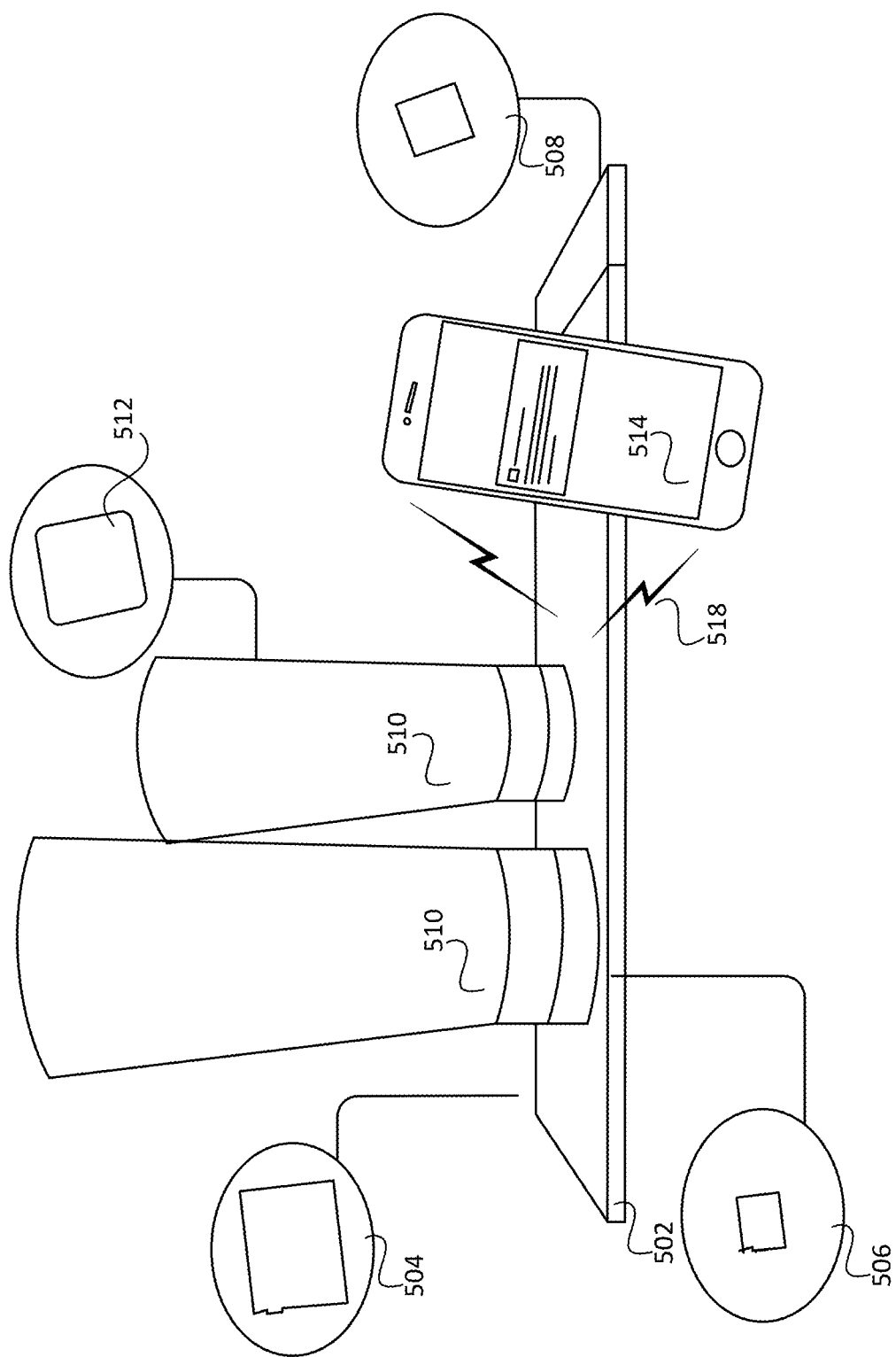
FIG. 5 is a diagram of a mat example according to certain embodiments disclosed here.

Alternatively or additionally, in some example embodiments, instead of or in addition to putting electronics into the cap of the products, the electronics could be in a separate pad or mat upon which the products may rest. FIG. 5 shows an example embodiment using a pad or mat. In FIG. 5, example embodiment, a mat or pad 502 with RFID sensors 504 and weight sensors 506 as well as communication equipment 508 integrated into and/or onto it, may be used to monitor usage of products 510. Such a mat 502 could use pressure sensitive materials such as piezoelectric sensors 506 to measure the weight of products 510 sitting or resting on it. In such examples, each product may have an RFID sticker 512 affixed to it to identify it. Such an example pad 502 could come in various shapes, for example slim so it could fit in a medicine cabinet or the smaller surface area of a bathroom counter or sink. In use, a member could put any product, in any orientation on this pad or mat. Once a product 510 is placed on the pad or mat 502, that would activate a radio frequency identifier (RFID) reader 504 in the pad or mat 502 to sense what product 510 is in close range. Each RFID sticker 512 may have an identifier which could indicate which product it is by a unique code in its meta data. Once the pad or mat 502 has recognized the product 510 it may do a weight measurement using any of various pressure sensors 506 integrated into or on the mat 502. That weight information may then be transmitted wirelessly 518, for example by Bluetooth or WiFi antenna and corresponding electronics, to a nearby wireless communications device such as a smart device 514 such as a smartphone or other computing device capable of wireless communications. From the wireless computing device, information may be transmitted to the local application and in some embodiments wirelessly to a network and then back end server as shown in FIG. 1 by the smart device to indicate usage change on the product.

In some examples, additionally or alternatively, the mat 502 may include communication systems to communicate with the smart caps attached to the bottles. In such examples, the mat receives indications of weight from a smart cap and communicates with a smart device 514 such as a smartphone. In such examples, combinations of weight measurement in the mat itself 502 and communications from the smartcap bottles 510 and its own internal weight systems as described above, could be accumulated, consolidated and sent to the smartphone 514 or other offload device to communicate with the back end systems as shown in FIG. 1 for ordering.

Data Aggregation and Analysis

Systems and methods here may be used to capture data on product usage to send to the back end servers and/or smart device applications. This data may be used to determine whether a replacement product needs to be ordered, correlating the capture data to a particular customer account, and then ordering a replacement product to the customer account, if it is determined that the received weight indicates that the product is almost out or out. Any number of thresholds may be set to the weight data in order to determine that a replacement product needs to be ordered. In some examples, the threshold may be set at the back end server. In some examples, a customer user may log into his or her account and set the threshold. In some examples, a combination of thresholds may be used to determine whether to place an order for a replacement product.

In some examples, the weight data bay also be aggregated, charted against time, geography, or otherwise analyzed which may be used to help a company with marketing, reorders, branding, product development, and any other kind of data driven procedures. For example, because product usage information may be captured and measured by the sensors in the product containers, and communicated quickly to the smart enabled wireless device, accurate usage data may be accumulated over time. This data can then be used to find usage trends of certain products and times. If the information of usage is paired with the subscription information including demographics of the customer user, even more information may be accumulated and utilized. Geographical trends may be analyzed, cultural and sex based trends may be found. Proximity trends may be generated and analyzed. By comparing usage trends from many different users, throughout many different geographies, the back end systems may be more quick to respond to product usage. More accurate thresholds may be calculated besides just historical usage of individual customer users. Pre-emptive sales or marketing may be created based on usage trends, and orders may be augmented with marketing material.

Example Computing Device

Example hardware for the component hardware located within the cap may include Particle Photon micro-controllers. In some examples, this hardware may include software executable by the hardware. In some examples, the software may be hosted on a cloud hosting web application such as but not limited to Paritice.build. The Particle Photon micocontroller hardware may be WiFi enabled and thereby be connected to a custom designed printed circuit board as described herein.

In some examples, the cap may house the hardware electronics that run any number of various sensors and communications, as well as the sensors themselves, or portions of sensors. In some examples, the bottle may house the sensors or portions of sensors. In some examples, the bottle and/or the cap may include wireless communication systems. Example power supplies include but are not limited to a small coin cell battery. In some examples, alternatively or additionally, a Particle P1 WiFi module with an antenna and a small computer (SoC) including a processor and memory as described herein, may be used as hardware in the cap itself. In some embodiments, alternatively or additionally, the hardware may include a single integrated circuit containing a processor core, memory, and programmable input/output peripherals. In some examples, alternatively or additionally, the printed circuit board may feature tiny surface mount components which may be locked into a cavity in the cap by a gasket such as a rubber or plastic gasket. Such a gasket may be used to keep moisture out and to keep the electronics hardware dry from any moisture in the bathroom during the use of the product.

Figure 6:
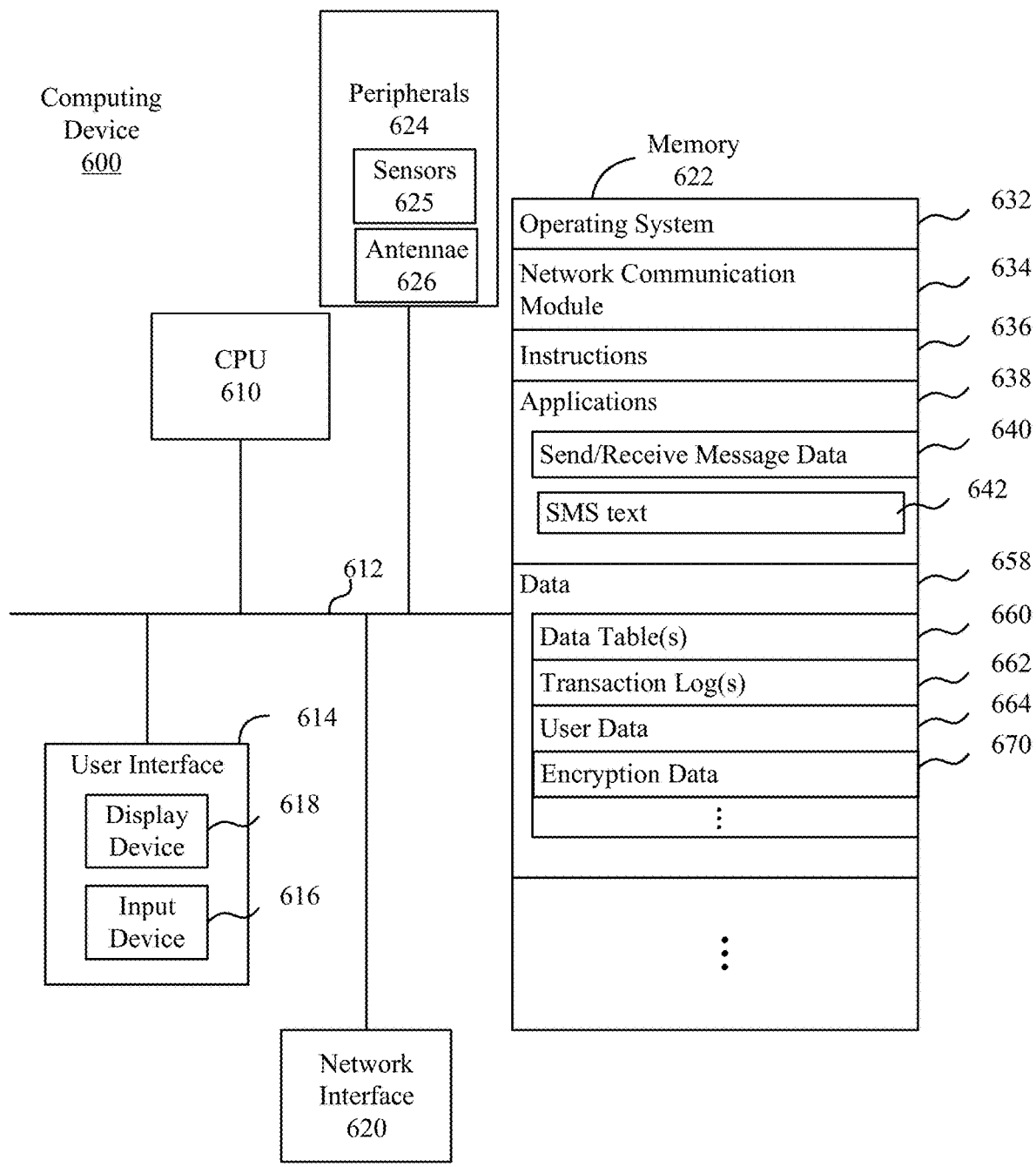
FIG. 6 is a diagram of computer hardware which may be used to practice the certain embodiments disclosed here.

FIG. 6 shows an example computing device 600 that may be used in practicing certain example embodiments described herein. Such computing device 600 may be the back end server systems use to interface with the network, receive and analyzed data, as well as generate test result GUIs. Such computer 600 may be a mobile device used to create and send in data, as well as receive and cause display of GUIs representing data. In FIG. 6, the computing device could be a smartphone, a laptop, tablet computer, server computer, or any other kind of computing device. The example shows a processor CPU 610 which could be any number of processors in communication via a bus 612 or other communication with a user interface 614. The user interface 614 could include any number of display devices 618 such as a screen. The user interface also includes an input such as a touchscreen, keyboard, mouse, pointer, buttons or other input devices. Also included is a network interface 620 which may be used to interface with any wireless or wired network in order to transmit and receive data. Such an interface may allow for a smartphone, for example, to interface a cellular network and/or WiFi network and thereby the Internet. The example computing device 600 also shows peripherals 624 which could include any number of other additional features such as but not limited to sensors 625, and/or antennae 626 for communicating wirelessly such as over cellular, WiFi, NFC, Bluetooth, infrared, or any combination of these or other wireless communications. The computing device 600 also includes a memory 622 which includes any number of operations executable by the processor 610. The memory in FIG. 6 shows an operating system 632, network communication module 634, instructions for other tasks 638 and applications 638 such as send/receive message data 640 and/or SMS text message applications 642. Also included in the example is for data storage 658. Such data storage may include data tables 660, transaction logs 662, user data 664 and/or encryption data 670.

Figure 7:
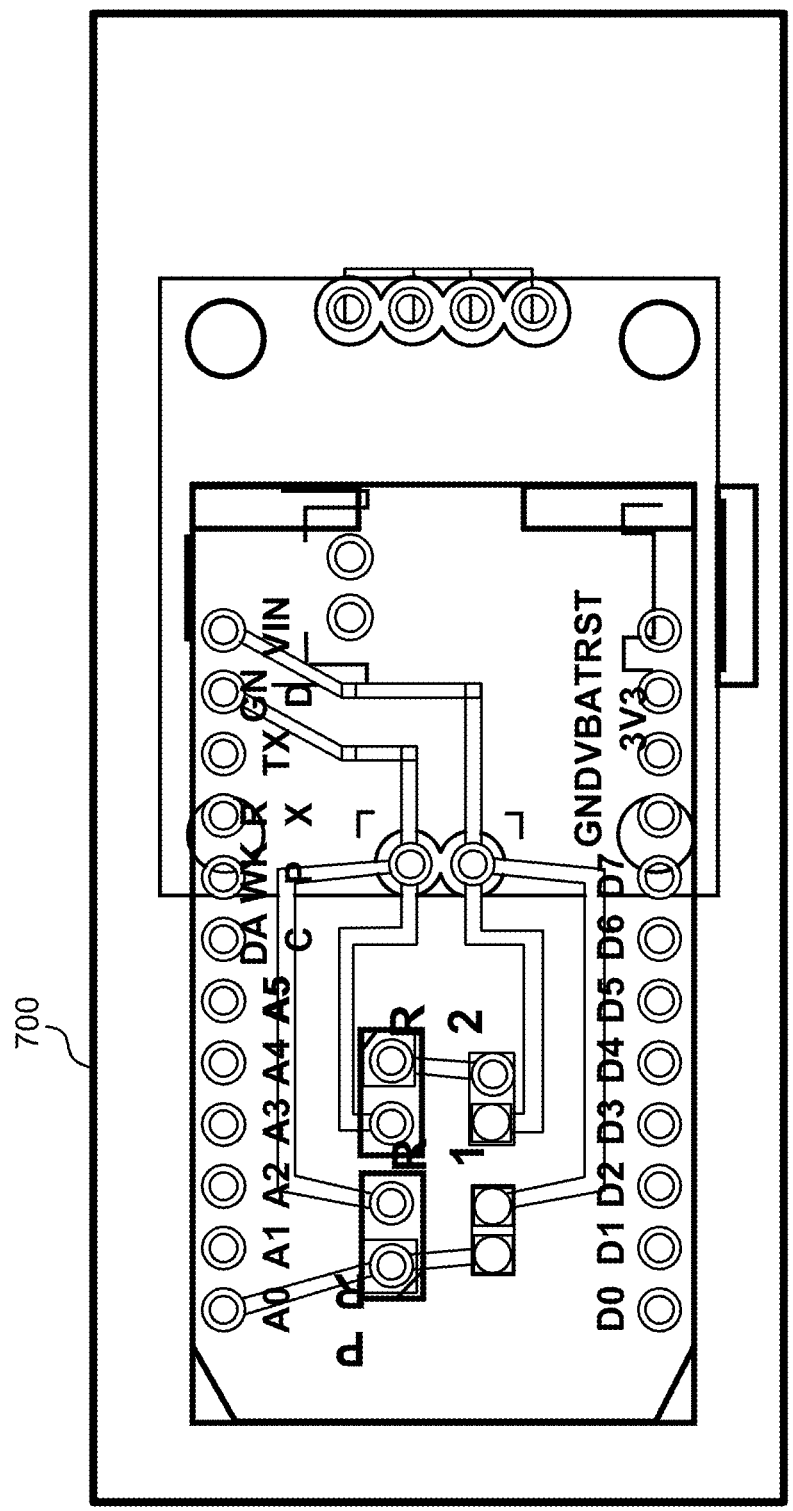
FIG. 7 is an example chip diagram which may be used to practice the certain embodiments disclosed here.

FIG. 7 is an example chip which may be used in the cap electronics as described herein.

Smart Handle Examples

Figure 8:
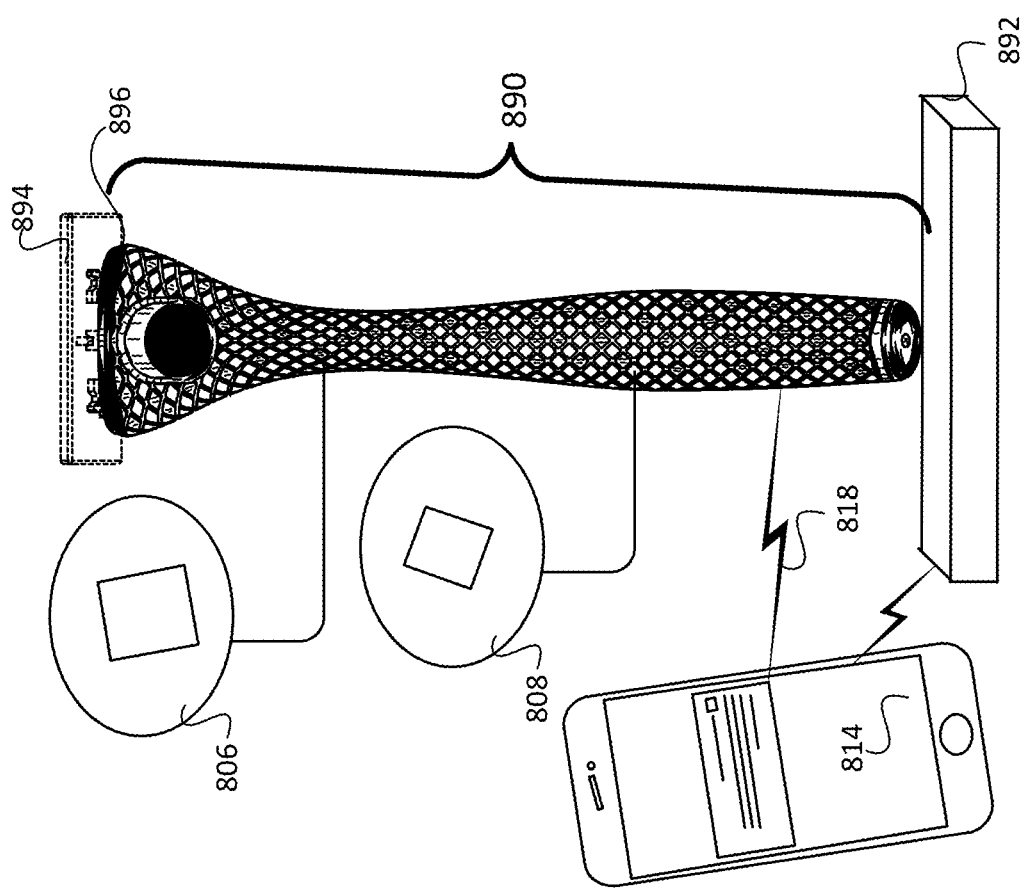
FIG. 8 is a diagram of a handle example according to certain embodiments disclosed here.

FIG. 8 shows an example smart handle arrangement. Such an arrangement may be similarly situated like the smart cap but instead of tracking how much of a physical product is extruded or removed from the container, the smart handle may track number of shave uses, cartridge use, intensity of each use, and/or duration of the same, accumulate and/or report such data as described above as well as integrate with the back end software and subscription user services as described in FIG. 2-4.

As shown in FIG. 1 the described smart features may be incorporated into a razor handle 190 just as it could in a bottle cap 106. The same electronics such as communication electronics such as antennae, computing chips, and sensors in order to help determine product usage may be embedded in a razor handle. Examples of sensors include, additionally or alternatively, weight and vibration sensors such as piezo electric sensors in the handle. Other sensors such as force sensors, and tilt balls may be used in certain examples as well. Additionally or alternatively to determine orientation of products, sensors such as a tilt ball or gyro including a ring laser gyro may be used.

These sensors, alone or in any combination, may be used to determine when a user picks up a razor handle, for how long it is used, and in some examples, how forcefully it is used. In such examples, an onboard computing system may store and/or communicate such information back to a user's smartphone computer, laptop, tablet, watch, glasses, mat (as described above), or other communication enabled products as described herein.

In an example, a handle 890 includes any of various sensors 806 as well as communication equipment 808 integrated into and/or onto it, may be used to monitor usage of the handle 890. Such a handle 890 could use pressure sensitive materials such as piezoelectric sensors, gyros, tilt ball sensors, or any other kind of sensor 806 to measure the weight, vibration, and/or any kind of movement in X, Y, and/or Z coordinates of the handle 890 in rest or in use. Time information such as actual time, duration of time, or other time data of such movement or usage may also be stored. Any combination of such information may then be transmitted wirelessly 818, for example by Bluetooth or WiFi antenna and corresponding electronics, to a nearby wireless communications device such as a smart device 814 such as a smartphone or other computing device capable of wireless communications. Such data could also or in the alternative, be stored in embedded or otherwise onboard computing features such as processor, memory, chip, or other computing electronics on the handle 890 itself.

Some example handles 890 may include a sensor 896 to determine that a cartridge 894 is connected to or docked to the handle 890. Such a sensor 896 could be a contact sensor positioned on or in the docking portion of the handle that is configured to connect with the cartridge itself 894. As most times a cartridge 894 is de-docked from a handle 890, it is to replace the cartridge 894, the handle 890 and computing components could determine and report how many times a cartridge is replaced, when it is replaced, how long each cartridge is in use, or any other kind of product usage statistics. In such examples, each cartridge then would not need any kind of electronics or extra features as the entirety of the cartridge usage tracking could be done by the handle 890 and its components itself.

In other examples, each cartridge could have a passive RFID embedded in it for an RFID reader in the handle 890 and/or charging station 892 to identify and report. In such examples, individual cartridges 894 could be tracked from shipment, duration of use measured and reported as described herein.

In some examples, a docking/charging station 892 may be used to charge a battery in the handle 890 such as a lithium-ion battery or other rechargeable battery. Such a charging station 892 could impart a battery charge through metal-on-metal connection, wirelessly, or through some other connection as is known in the art. Such a charging station 892 could also be equipped with its own weight sensors or element contact sensors that could send information regarding data as to when a handle 890 is removed from the station 892 and when it is returned, thereby determining a duration of use of the handle 890. In some examples, the docking/charging station 892 may trigger a synchronization signal from the handle 890 to the smart device 814 which would initiate the handle 890 contacting the smart device 814 and sending usage data.

In some examples, handles 890 could include identifying features so they could be paired to user profiles in a proprietary application running on the smart computing device 814, to accurately link a handle 890 to a user and thereby support multiple handles located within close proximity such as in a single household. In such a way, the smartcap described above could also link to member profile(s) for data tracking and analysis and all of the caps and handles in a given area could be tracked, analyzed and linked to user profiles at the back end as described above.

It should be noted that FIGS. 2-4 described using the smart cap replacement could also be used alternatively or in addition to the handle examples. Cartridges for the handles could be ordered automatically, reminders of replacements could be sent to a smart device for a user who has not switched out a cartridge after a set time, or any number of other user based reminders or orders could be affected using the systems and methods described herein.

CONCLUSION

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1 PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks by one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Etc.

What is claimed is:

1. A system, comprising:
   a razor handle;
   a movement sensor positioned inside the handle, configured to sense movement of the handle and a contact sensor, configured to sense when a cartridge is mounted and dismounted on the razor handle;
   a wireless communication system positioned in the handle configured to communicate with a smartphone;
   a computing device in communication with the sensor and the wireless communication system, the computing device configured to receive a signal from the sensor regarding the sensed cartridge and movement of the handle and send data via the wireless communication system to a mobile device regarding the movement,
   wherein the mobile device includes an application configured to generate a prediction when the sensed razor cartridge, in communication with the handle should be replaced, based on a comparison of a pre-determined threshold and the time usage data for the sensed cartridge, and send the prediction to a back end computing system along with a correlated customer profile information;
   wherein the back end computing system is configured to send a message to the mobile device application indicating a need to re-order.

2. The system of claim 1 further comprising, wherein the computing device is configured to determine time and wherein the data sent via the wireless communication system includes time data.

3. The system of claim 1 further comprising a contact sensor positioned on a docking end of the handle, the contact sensor configured to sense connection of a razor cartridge to the handle.

4. The system of claim 3 wherein the contact sensor is further configured to communicate to the computing system regarding any disconnection, connection, and/or pressure of usage of cartridge.

5. The system of claim 1 wherein the wireless communication system is a Bluetooth Low Energy (BLE) system or a WiFi system.

6. The system of claim 1 wherein the movement sensor is one of a vibration sensor to sense vibration and a tilt-ball sensor configured to sense handle orientation.

7. The system of claim 1 wherein the cartridge sensor includes a radio frequency identifier (RFID) sensor to identify a cartridge.

8. The system of claim 1 wherein the movement sensor is a tilt ball sensor.

9. A method comprising:
   sensing, by a contact sensor when a cartridge is mounted and dismounted on a razor handle;
   sensing a movement of the razor handle by a sensor positioned inside the handle;
   receiving movement data from the sensor by a computing device positioned inside the handle;
   sending the movement data from the computing device to a mobile device by a wireless communication system positioned inside the handle;
   generating, at an application running on the mobile device, a prediction when the razor cartridge, in communication with the handle should be replaced, based on a comparison of a pre-determined threshold and the movement data for the sensed cartridge, and sending the prediction to a back end computing system along with a correlated customer profile information;
   sending a message, by the back end computing system, to the mobile device application indicating a razor cartridge replacement.

10. The method of claim 9 further comprising, determining, by the computing device, time and wherein the data sent via the wireless communication system includes time data.

11. The method of claim 9 further comprising, sensing, by a contact sensor positioned on a docking end of the handle, contact with the razor cartridge.

12. The method of claim 11 further comprising, communicating, by the contact sensor to the computing system, regarding disconnection, connection, and/or pressure of usage of the razor cartridge.

13. The method of claim 9 wherein the wireless communication system is a Bluetooth Low Energy (BLE) system or a WiFi system.

14. The method of claim 9 further including sensing vibration by a vibration sensor and sensing handle orientation by a tilt-ball sensor.

15. The method of claim 9 further comprising:
   by the back end computing system, ordering a replacement product to the customer account, based on the prediction.

16. The method of claim 9 wherein the contact sensor includes a radio frequency identifier (RFID) sensor to identify a cartridge.

17. A system, comprising:
   a razor handle;
   a tilt ball sensor positioned inside the handle, configured to sense movement of the handle;

a contact sensor positioned on a docking end of the handle configured to sense a cartridge docked in the handle;

a wireless communication system positioned in the handle;

a computing device positioned in the handle in communication with the tilt ball sensor and contact sensor and the wireless communication system, the computing device configured to receive a signal from the tilt ball sensor regarding the movement of the handle, and contact information from the contact sensor, and send usage data via the wireless communication system to a mobile device regarding the movement for the sensed cartridge;

wherein the mobile device includes an application configured to, generate a prediction when the sensed razor cartridge, in communication with the handle should be replaced, based on a comparison of a pre-determined threshold and the usage data, and send the prediction to a back end computing system along with a correlated customer profile information;

wherein the back end computing system is configured to send a message to the mobile device application indicating a need to re-order.

18. The system of claim 17 further comprising: a charging station configured to recharge a battery in the handle.

19. The system of claim 18 wherein the charging station is further configured to send a synchronization signal to the handle to trigger a data synchronization with the mobile device.

20. The system of claim 17 wherein the contact sensor includes a radio frequency identifier (RFID) sensor to identify a cartridge.

\* \* \* \* \*